(12) United States Patent
Govoni et al.

(10) Patent No.: US 10,680,676 B2
(45) Date of Patent: Jun. 9, 2020

(54) UNDERWATER SIGNAL CONVERSION

(71) Applicant: The Government of the United States, as represented by the Secretary of the Army, Washington, DC (US)

(72) Inventors: Mark Govoni, Abingdon, MD (US); John Suarez, Brooklyn, NY (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 246 days.

(21) Appl. No.: 15/729,830

(22) Filed: Oct. 11, 2017

(65) Prior Publication Data

US 2018/0048991 A1    Feb. 15, 2018

Related U.S. Application Data

(62) Division of application No. 14/479,389, filed on Sep. 8, 2014, now Pat. No. 9,794,737.

(51) Int. Cl.
*G01R 1/20* (2006.01)
*H04B 5/00* (2006.01)

(52) U.S. Cl.
CPC .................. *H04B 5/0031* (2013.01)

(58) Field of Classification Search
CPC .......... G01B 21/00; H01F 38/14; H02M 5/40; H04B 5/0031; H04W 4/02; H02J 50/10; G01R 25/00; G01R 23/00; G01R 23/02; G01R 27/28; G01R 27/02; G01S 3/48; H03M 2201/192; H03M 2201/4135; H03M 2201/4225; H03M 2201/4233
See application file for complete search history.

(56) References Cited

U.S. PATENT DOCUMENTS

| 4,090,170 | A | 5/1978 | Lincklaen-Aniens et al. |
| 4,747,085 | A | 5/1988 | Dunegan et al. |
| 5,077,703 | A | * | 12/1991 | Strauss ................ G01S 3/046 367/118 |
| 6,272,072 | B1 | 8/2001 | Wulich et al. |
| 7,006,407 | B2 | 2/2006 | Davis et al. |
| 7,139,223 | B1 | 11/2006 | Scarzello et al. |
| 7,176,589 | B2 | 2/2007 | Rouquette |

(Continued)

*Primary Examiner* — Thang X Le
(74) *Attorney, Agent, or Firm* — Ronald Krosky; Azza Jayaprakash

(57) ABSTRACT

Various embodiments associated with signal conversion while underwater are described. A source can transmit an alternating current signal with a relatively high frequency over a relatively long distance. The alternating current signal with the relatively high frequency can be converted to an alternating current signal with a relatively low frequency. An example of this conversion can be done by converting the alternating current signal with the relatively high frequency into a direct current signal. The direct current signal can then be converted into the alternating current signal with the relatively low frequency. The alternating current signal with the relatively low frequency can be transmitted from a transmission coil to a pick-up coil. After reception by the pick-up coil the alternating current signal with the relatively low frequency can be processed, such as processed to determine a direction of the source of the alternating current signal with the relatively high frequency.

19 Claims, 14 Drawing Sheets

(56) References Cited

U.S. PATENT DOCUMENTS

| | | |
|---|---|---|
| 7,796,466 B2 | 9/2010 | Combee et al. |
| 8,299,936 B2 | 10/2012 | Papadopoulos |
| 8,681,000 B2 | 3/2014 | August et al. |
| 2002/0109601 A1* | 8/2002 | Arens ................ G08B 13/1427 340/573.1 |
| 2009/0021076 A1 | 1/2009 | Kunow et al. |
| 2010/0085839 A1 | 4/2010 | Rhodes et al. |
| 2010/0109933 A1 | 5/2010 | Rhodes et al. |
| 2010/0156193 A1 | 6/2010 | Rhodes et al. |
| 2011/0055746 A1* | 3/2011 | Mantovani ............. B63C 11/26 715/771 |
| 2012/0195385 A1 | 8/2012 | Puchianu |
| 2013/0195465 A1 | 8/2013 | Rhodes et al. |
| 2013/0272098 A1* | 10/2013 | Cahalan ................ H04B 13/02 367/134 |
| 2016/0013871 A1* | 1/2016 | Sinha .................... G10K 11/04 367/137 |
| 2016/0351205 A1* | 12/2016 | Imran ................ G10L 21/0364 |

\* cited by examiner

UNDERWATER SIGNAL CONVERSION

CROSS-REFERENCE

This application is a divisional application of, and claims priority to, U.S. application Ser. No. 14/479,389 filed on Sep. 8, 2014. U.S. application Ser. No. 14/479,389 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

To dive underwater, a diver may employ different pieces of equipment. One example piece of equipment can be a breathing apparatus that includes an oxygen tank, hoses, and a mouthpiece. This breathing apparatus can enable the diver to stay underwater for a significant period of time. However, employment of the breathing apparatus can provide drawbacks. In one example, the driver cannot verbally communicate due to the mouthpiece and the fact that the diver is underwater. Therefore, communication for the diver while underwater can be limited. This can be a serious situation based on circumstances, such as when emergency circumstances occur.

SUMMARY

In one embodiment, a system comprises a first conversion component, a second conversion component, and a transmitter. The first conversion component can be configured to convert a high frequency alternating current signal to a direct current signal, where a voltage value of the direct current signal corresponds to a frequency value of the high frequency alternating current signal. The second conversion component can be configured to convert the direct current signal to a low frequency alternating current signal, where the frequency value of the low frequency alternating current signal corresponds to the voltage value of the direct current signal. The transmitter can be configured to, when underwater, transmit the low frequency alternating current signal to a near-field receiver that is also underwater In one embodiment, a method comprises receiving, by a diving glove, a low frequency alternating current signal while the diving glove is underwater. The method also comprises converting the low frequency alternating current signal to a direct current voltage, where the direct current voltage is employed to determine a location of a base signal from which the low frequency alternating current signal is based.

In one embodiment, a system comprises a digital conversion component, an analog conversion component, and an emitter. The digital conversion component can convert a high frequency alternating current signal to a direct current signal, where a voltage value of the direct current signal corresponds to a frequency value of the high frequency alternating current signal and where the frequency value indicates a direction of a source of the high frequency alternating current signal. The analog conversion component can convert the direct current signal to a low frequency alternating current signal, where a frequency value of the low frequency alternating current signal corresponds to the voltage value of the direct current signal. The emitter can emit the low frequency alternating current signal to a near-field receiver when the emitter and the near-field receiver are underwater, where the near-field receiver processes the low frequency alternating current signal to determine the direction

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
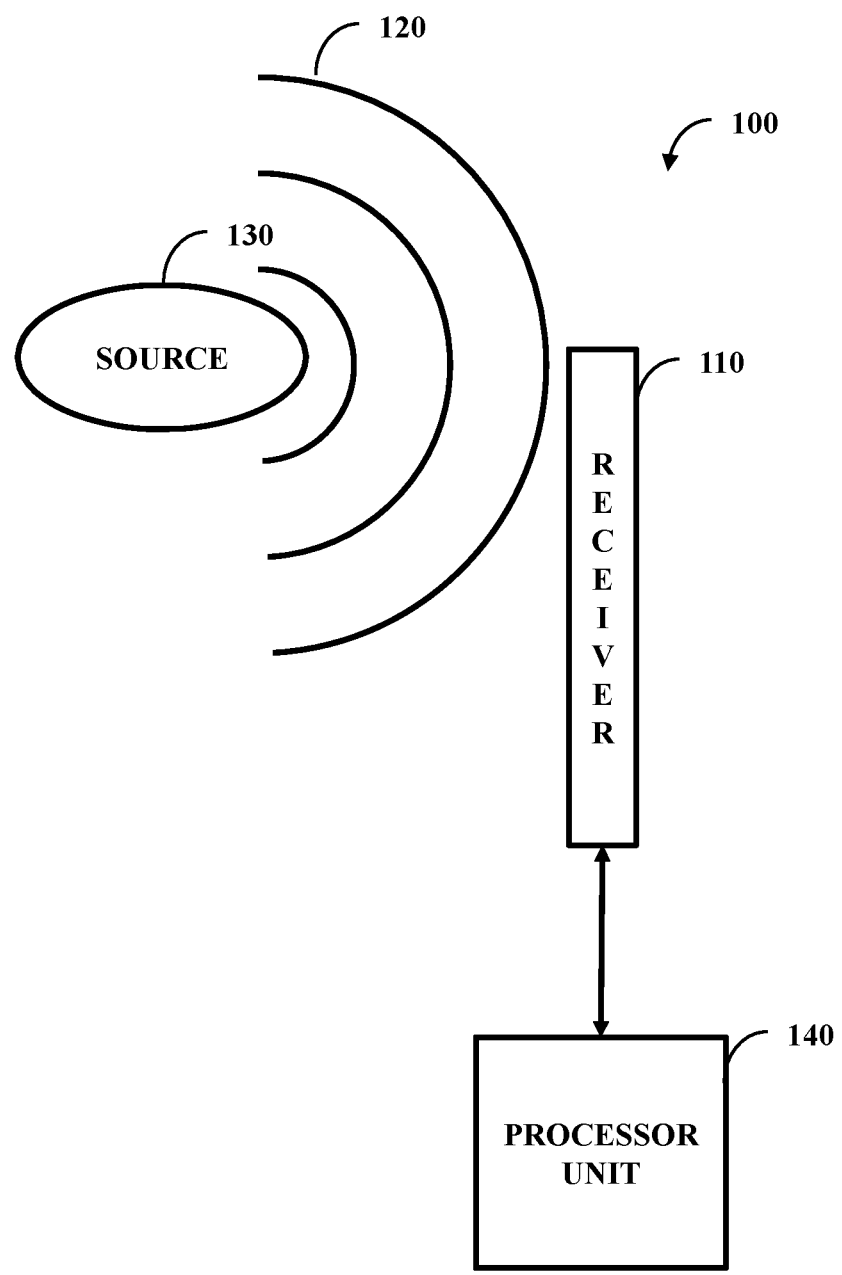
FIG. 1 illustrates one embodiment of an environment in which a receiver receives a signal from a source that is processed by a processor unit.

In an underwater environment, communication among divers can be difficult especially over long ranges. To alleviate this problem, divers can be equipped with antennas that receive signals. The received signals can provide various types of information, such as directional information of a source of the signal. Once received, the signal can be processed and a heads-up display on a mask of a diver can provide information to the diver based on this processed signal. In one example, directional information relative to the diver can be presented on her heads-up display.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of an environment in which a receiver 110 receives a signal 120 from a source 130 that is processed by a processor unit 140. The source 130 can emit the signal 120 that is received by the receiver 110. In one example, the source 130 can be a piece of equipment of a diver and the signal 120 can be a distress signal that communicates positional information of the source 130. The distress signal can be emitted by the diver by pressing a button, emitted when a condition is met (e.g., when the diver becomes unconscious as determined by way of a biometric sensor), etc. In one example, the signal 120 can be a passive signal from which location and/or direction information can be ascertained. The source 130 can select a signal type (e.g., distress signal when an injury occurs, lost signal when a diver becomes disoriented on his location, etc.) and emit the signal 120 of that type.

The receiver 110 can receive the signal 120. Acoustic energy of the signal 120 can couple with an antenna array of the receiver 110 as part of this reception. The receiver 110 can be a hardware device that is a low-profile telescopic mast. In one example, the mast can be cylindrical that when fully-retracted can be about 4 inches and when fully-extended can be about 36 inches. With this example, the receiver 110 can have a pointer tip integrated with an antenna to receive the signal 120. The pointer tip can obtain the signal 120 and the signal 120 can be transferred down a conductive surface of the mast and then sent to the processor unit 140 (e.g., that is separate from the receiver 110, that is at least partially part of the receiver 110, etc.).

Figure 2:
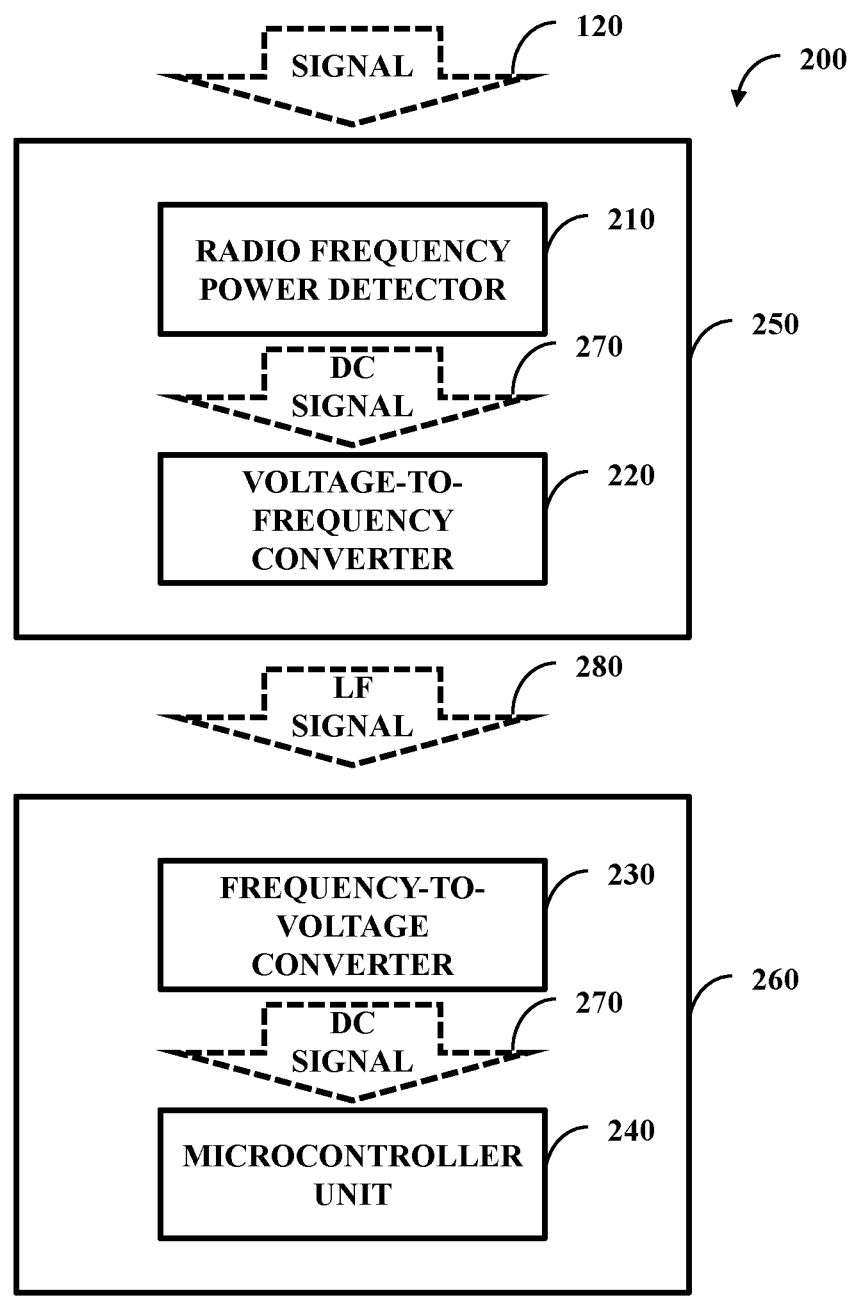
FIG. 2 illustrates one embodiment of system comprising a radio frequency power detector, a voltage-to-frequency converter, a frequency-to-voltage converter, and a microcontroller unit.

FIG. 2 illustrates one embodiment of a system 200 comprising a radio frequency power detector 210, a voltage-to-frequency converter 220, a frequency-to-voltage converter 230, and a microcontroller unit 240. In one embodiment, the processor unit 140 of FIG. 1 can comprise at least part of the system 200. The system 200 can be divided into two parts—a receiver portion 250 that can be integrated into a handle of the receiver 110 of FIG. 1 and a body portion 260 that can be integrated into bodywear of the diver (e.g., integrated into a palm section of a wetsuit glove).

The radio frequency power detector 210 and the voltage-to-frequency converter 220 can integrate into the receiver portion 250. The signal 120 that is received by the receiver 110 of FIG. 1 can be a radio frequency (time-variant) signal that is at a high frequency. The radio frequency power detector 210 (e.g., envelope broadband detector) can convert the signal 120 to a direct current (DC) signal 270 with a specific voltage value proportional an acoustic signal power input of the signal 120. The voltage-to-frequency converter 220 can take the DC signal 270 with the specific voltage value and convert it to a time variant signal, but at a lower frequency than the initially received radio frequency to become the low frequency (LF) signal 280. The receiver portion 250 can transmit the lower frequency time variant signal (LF signal 280) by way of a transmission coil to the body portion 260.

The body portion 260 can receive the lower frequency time variant signal (LF signal 270) by way of a pick-up coil. The frequency-to-voltage converter 230 can convert the lower frequency time variant signal (LF signal 280) back to the DC signal 270 with the specific voltage value. The microcontroller unit 240 can then process the DC signal 270 to identify the specific voltage value and then use the specific voltage value (e.g., to determine the location of the source 130 of FIG. 1). As an alternative to the microcontroller unit 240 an analog unit can be employed in the body portion 260 to process the DC signal 270.

In one example, the signal 120 can indicate position information of the source 130 of FIG. 1. The specific voltage value selected by the radio frequency power detector 210 can correlate to the position information. The lower frequency time variant signal (LF signal 280) can directly correspond to the specific voltage value (e.g., determined by way of a look-up table) for use by the converters 220 and 230. Therefore, by way of the specific voltage value, the microcontroller unit 240 can receive the correct position information. The microcontroller unit 240 can use the specific voltage value to communicate the position information of the source 130 of FIG. 1 to the diver (e.g., by way of a mask of the diver).

Figure 3:
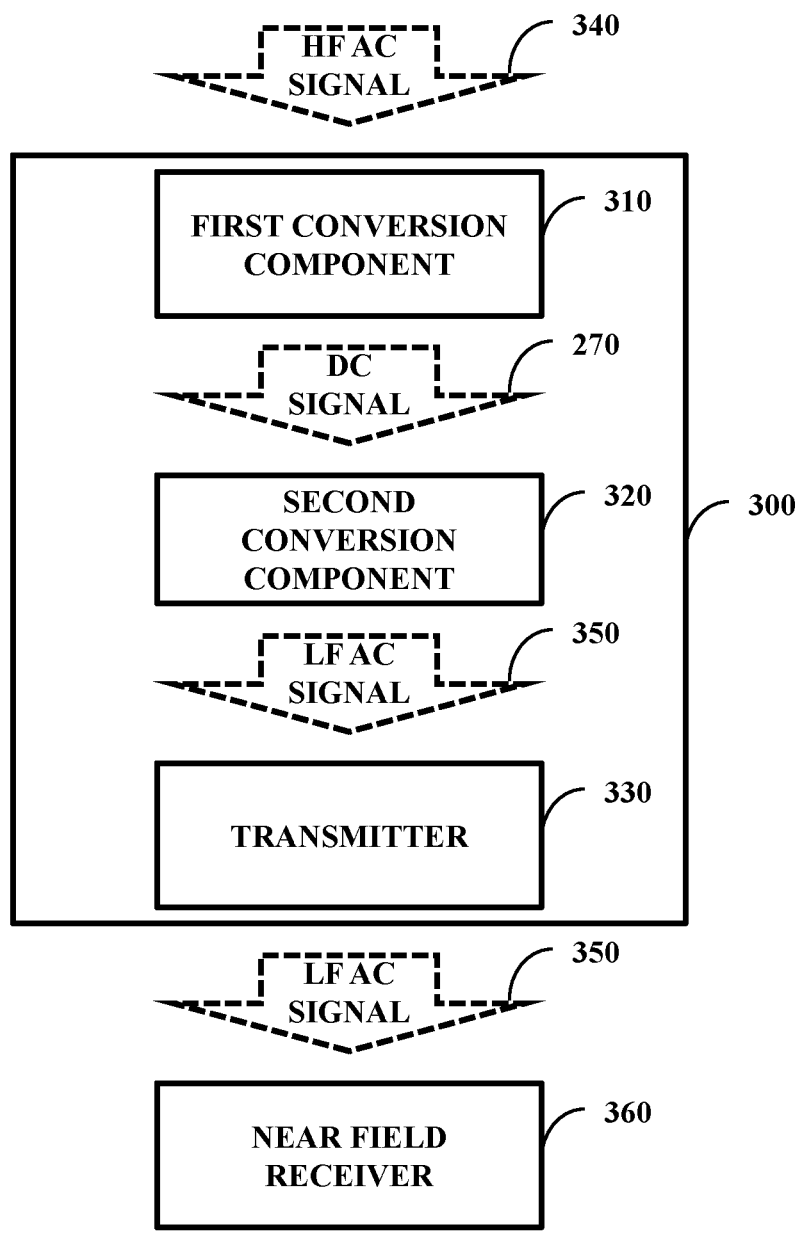
FIG. 3 illustrates one embodiment of a system comprising a first conversion component, a second conversion component, and a transmitter.

FIG. 3 illustrates one embodiment of a system 300 comprising a first conversion component 310, a second conversion component 320, and a transmitter 330. The first conversion component 310 can be configured to convert a high frequency (HF) alternating current (AC) signal 340 (e.g., the signal 120 of FIG. 1 as an acoustic location signal)

to the DC signal 270. A voltage value (e.g., the specific voltage value) of the DC signal 270 can correspond to a frequency value of the HF AC signal 340. In one example, the radio frequency power detector 210 of FIG. 2 functions as the first conversion component 310.

The second conversion component 320 can be configured to convert the DC signal 270 to an LF AC signal 350. In one embodiment, this conversion can take place through use of a voltage control oscillator. The frequency value of the LF AC signal 350 can correspond to the voltage value of the DC signal 270. Therefore, the LF AC signal 350 can communicate the same information as the HF AC signal 340, but at a different frequency (at a lower frequency). In one embodiment, a look-up table can be employed for conversion between DC and AC by either or both of the conversion components 310 and 320. In one embodiment, the voltage-to-frequency converter 220 of FIG. 2 can function as the second conversion component 320.

The transmitter 330 (e.g., that is part of the voltage-to-frequency converter 220 of FIG. 2) can be configured to transmit the LF AC signal 350 to a near-field receiver 360 (e.g., that is part of the frequency-to-voltage converter 230 of FIG. 2). The first conversion component 310, the second conversion component 320, the transmitter 330, the near-field receiver 360, or a combination thereof can function while underwater and/or be resident upon a collection unit (e.g., the receiver 110 of FIG. 1). In one example, the first conversion component 310, the second conversion component 320, and the transmitter 330 can be encompassed in the handle of the receiver 110 of FIG. 1 while the near-field receiver 360 (e.g., the body portion 260 of FIG. 2 that includes the near-field receiver 360) can be encased in a plastic capsule that is part of bodywear of a diver (e.g., attached to a part of a wetsuit).

The transmitter 330 can employ a transmission coil to transmit the LF AC signal 350 to the near-field receiver 360. The near-field receiver 360 can employ or be a reception coil to receive the LF AC signal 350 from the transmitter 330. The transmission coil and reception coil can work inductively to communicate the LF AC signal 350 from the transmitter 330 to the near field receiver 360.

Figure 4:
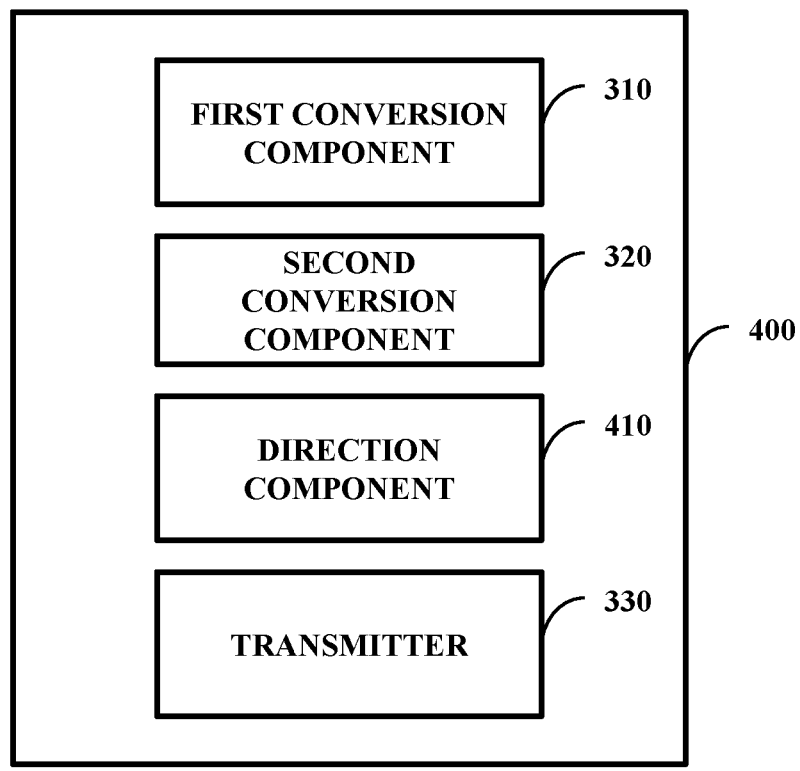
FIG. 4 illustrates one embodiment of a system comprising the first conversion component, the second conversion component, the transmitter, and a direction component.

FIG. 4 illustrates one embodiment of a system 400 comprising the first conversion component 310, the second conversion component 320, the transmitter 330, and a direction component 410. The direction component 410 can be configured to determine a direction of the source 130 of FIG. 1 of the signal 120 of FIG. 1. This can be when the signal 120 of FIG. 1 is the HF AC signal 340 of FIG. 3. The HF AC signal 340 of FIG. 3 can communicate the direction of the source 130 of FIG. 1. This communication can be direct communication (e.g., expressly communicate the information) or be indirectly communicated such that the direction can be determined from signal information.

The direction component 410 can determine the direction through various manners. In one example, the direction component 410 can be configured to determine the direction through time-direction of arrival analysis. In one example, the direction component 410 can be configured to determine the direction through omni-directional transpondence analysis. More detail regarding function of determining direction is addressed below with the discussion for FIG. 8.

Figure 5:
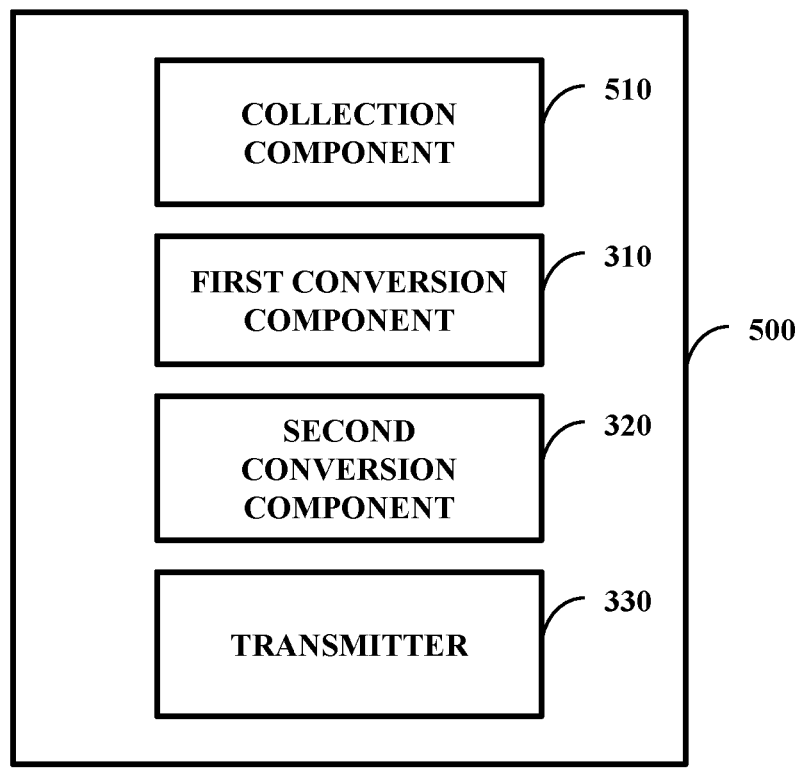
FIG. 5 illustrates one embodiment of a system comprising the first conversion component, the second conversion component, the transmitter, and a collection component.

FIG. 5 illustrates one embodiment of a system 500 comprising the first conversion component 310, the second conversion component 320, the transmitter 330, and a collection component 510. The collection component 510 can be configured to collect the HF AC signal 340 of FIG. 3 prior to conversion to the DC signal 270 of FIG. 3. Example types of collection can include actively obtaining the HF AC signal 340, passively receiving the HF AC signal 340, accessing the HF AC signal 340 from storage, etc. The collection component 510 can collect the HF AC signal from a repeater 610 discussed below and/or the source 130 of FIG. 1.

Figure 6:
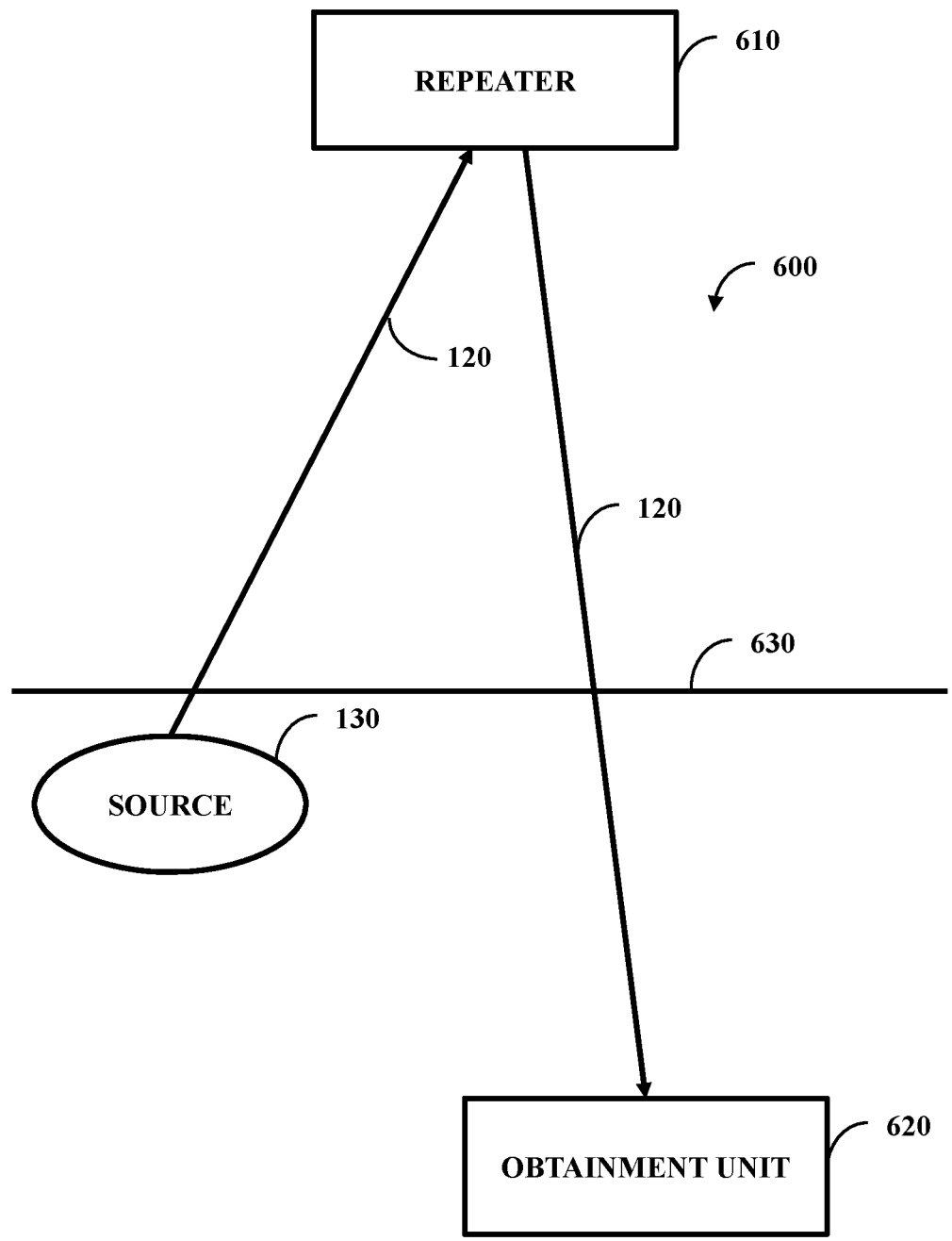
FIG. 6 illustrates one embodiment of an environment comprising the source, a repeater, and an obtainment unit.

FIG. 6 illustrates one embodiment of an environment 600 comprising the source 130, the repeater 610, and an obtainment unit 620. The obtainment unit 620 can comprise the receiver 110 of FIG. 1 and/or the processor unit 140 of FIG. 1 (and in turn aspects of FIGS. 2 and 3). The source 130 can be under a body of water with a water level of 630 and transmit the signal 120 that is of interest to the obtainment unit 620. However, the obtainment component 620 may not receive the signal 120 directly from the source 130. This can be due to various factors, such as an obstruction blocking direction communication between the source 130 and the obtainment unit 620 or the source 130 and obtainment unit 620 being configured to communicate directly with a central unit (e.g., the repeater 610).

The repeater 610 can be a satellite or other object (e.g., communication device on an airplane) that propagates the signal 120 and/or produces the signal 120 (e.g., in response to instruction from the source 130). In one embodiment, the repeater 610 repeats the signal 120 from the source 130 to the obtainment unit 620. In one embodiment, the source 130 sends the signal 120 in an encrypted manner so as to not have its content ascertained by an unintended force. The repeater 610 can decipher the signal 120, re-encrypt the signal 120 (e.g., using the same encryption as from the source 130 to the repeater 610 or a different encryption), and send the signal 120 re-encrypted to the obtainment unit 620. In one example, the source 130 can be of one military force while the obtainment unit 620 is of another friendly force. While the forces are friendly, they may not wish for the other to know their encryption algorithms and therefore the repeater 610 can function to mask encryption details from the forces.

Figure 7:
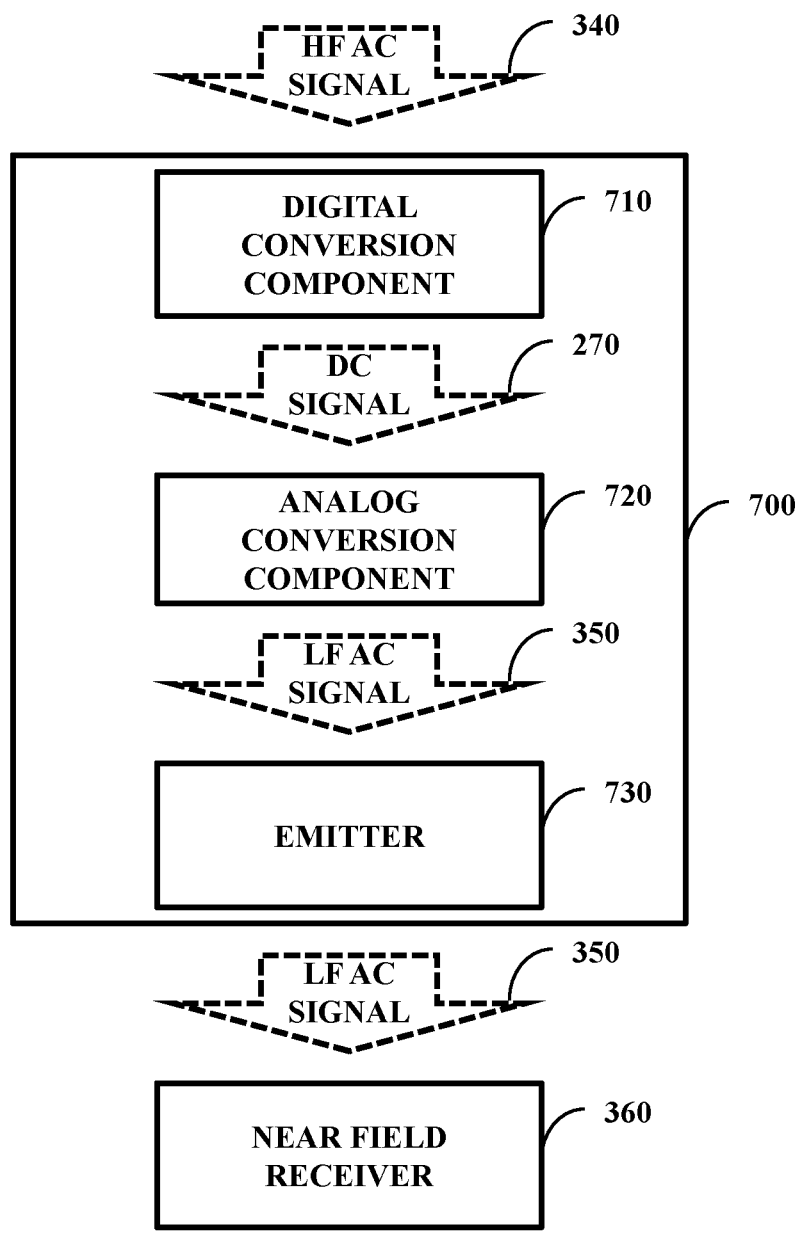
FIG. 7 illustrates one embodiment of a system comprising a digital conversion component, an analog conversion component, and an emitter.

FIG. 7 illustrates one embodiment of a system 700 comprising a digital conversion component 710, an analog conversion component 720, and an emitter 730. The digital conversion component 710 can convert the HF AC signal 340 (e.g., a distress signal) to the DC signal 270. A voltage value of the DC signal 270 can correspond to a frequency value of the HF AC signal 340. The frequency value indicates a direction of the source 130 of FIG. 1 of the HF AC signal 340. The analog conversion component 720 can convert the DC signal 270 to the LF AC signal 350. A frequency value of the LF AC signal 350 can correspond to the voltage value of the DC signal 270 and thus in turn correspond to the frequency value of the HF AC signal 340.

The emitter 730 can emit the LF AC signal 350 to the near-field receiver 360 when the emitter 730 and the near-field receiver 360 are underwater. The near-field receiver 360 can processes the LF AC signal 350 to determine the direction (e.g., the direction relative to the near-field receiver 360, the direction relative to a view position of a diver, etc.). The emitter 730 can employ an emission coil to emit the LF AC signal 350 to the near-field receiver 360 while the near-field receiver 360 can employ a reception coil to receive the LF AC signal 350 from the emitter 730. The near-field receiver 360 can convert the LF AC signal 350 to the DC signal 270 and employ the DC signal 270 to determine the direction. The near-field receiver 360 of can be part of the body portion 260 of FIG. 2 and can cause information based on the direction to be displayed by way of an underwater mask of the diver.

Figure 8:
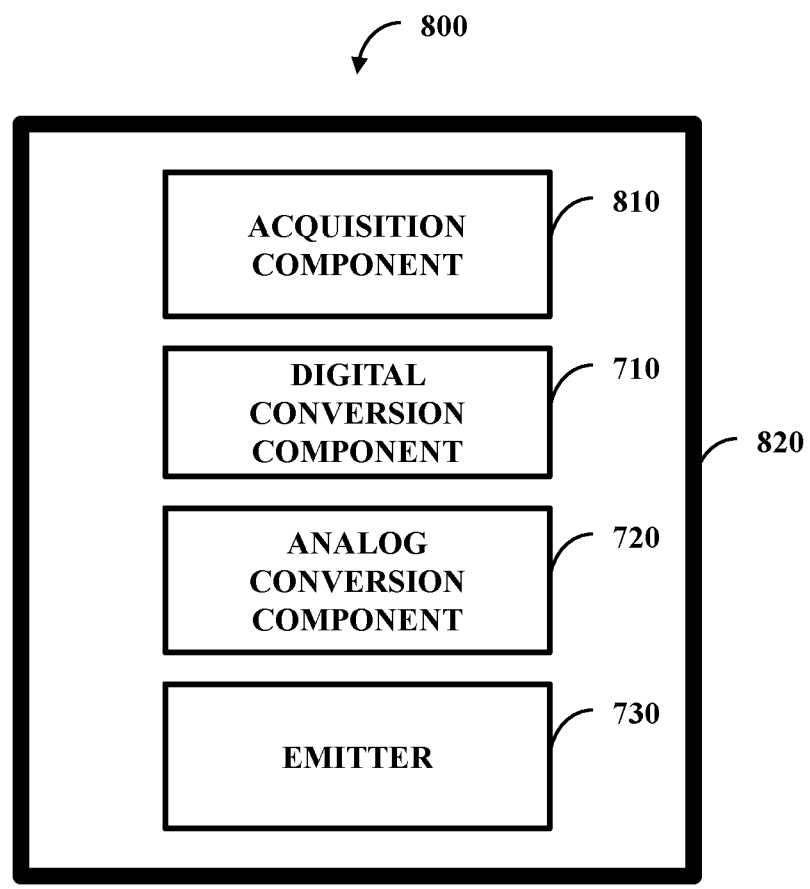
FIG. 8 illustrates one embodiment of a system comprising the digital conversion component, the analog conversion component, the emitter, an acquisition component, and a housing.

FIG. 8 illustrates one embodiment of a system 800 comprising the digital conversion component 710, the analog conversion component 720, the emitter 730, an acquisition component 810, and a housing 820. The acquisition component 810 can acquire the HF AC signal 340 of FIG. 7. Example implementations by which this acquisition of the acquisition component 810 can occur can be through radio frequency based monopulse beamforming (e.g., use of a single phase center antenna with an assumption of varying amplitude and constant phase) or phase monopulse beamforming (e.g., use of multiple antennas separated by a distance d with an assumption of varying phase and constant amplitude). The acquisition component 810 can use a sum-channel $\Sigma$ and azimuth difference-channel $\Delta_{az}$ as part of beamforming. The difference-channel can indicate an azimuth direction of the signal 120 of FIG. 1 while the sum-channel can indicate signal amplitude. For phase based monopulse beamforming a path length difference for the signal 120 of FIG. 1 at azimuth angle $\theta$ to reach the receiver 110 of FIG. 1 can be defined by $\Delta R = d \sin(\theta)$. The time-difference-of-arrival (TDOA) for the signal 120 of FIG. 1 at an arriving angle $\theta$ off an antenna broadside can be defined as $\delta T = d \sin(\theta)/c$, where c is the speed of light ($3 \times 10^8$ m/sec). Both amplitude and phase monopulse beamforming can measure the $\Delta_{az}/\Sigma$ voltage ratio in order to estimate the error angle $\epsilon\theta$. Subsequently, this estimate can be used by the direction component 410 of FIG. 4 to determine the direction of arrival for the signal 120 of FIG. 1.

The housing 820 can retain the acquisition component 810, the digital conversion component 710, the analog conversion component 720, the emitter 730, at least one other component or other item (e.g., converter) disclosed herein, or a combination thereof. The housing 820 can be configured for use underwater such that a component retained by the housing 820 can function while underwater. The housing 820 can be of a shape for retention within the palm of a diving glove. In one example, the housing 820 can be a plastic handle of the receiver 110 of FIG. 1 that can be gripped by the diving glove. The near-field receiver 360 of FIG. 7 can be resident upon a diving glove. For the near-field receiver 360, being resident on the diving glove can include being in a palm area, wrist area, finger area, thumb area, etc.

Figure 9:
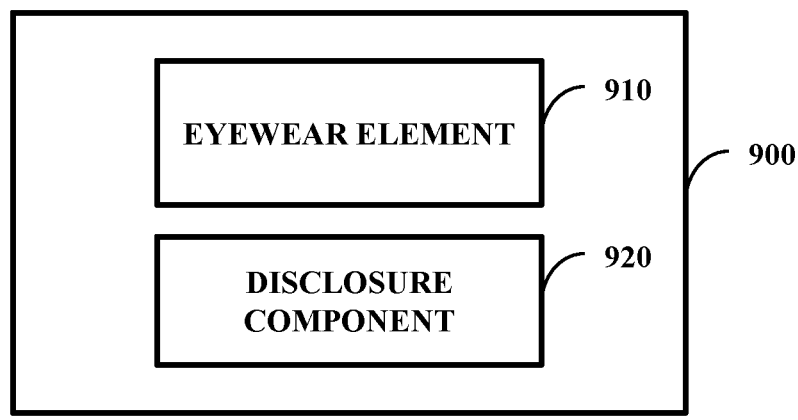
FIG. 9 illustrates one embodiment of a system comprising an eyewear element and a disclosure component.

FIG. 9 illustrates one embodiment of a system 900 comprising an eyewear element 910 and a disclosure component 920. The system 900 can be part of an underwater mask that can be considered in at least some instances part of the body portion 260 of FIG. 2. Example underwater masks include a full-head mask, a full-face mask, an eye cover element (e.g., that does not cover nose or mouth), goggles, a SCUBA (self-controlled underwater breathing apparatus) mask, a mask appropriate for deep sea diving, or a mask appropriate for snorkeling.

The mask can comprise the eyewear element 910 and the eyewear element 910 can be substantially transparent. In one example, the eyewear element 910 can be made of a plastic or other compound that can have information displayed such that a wearer can see through at least part of the eyewear element 910, but the wearer can also be presented with information by way of the eyewear element 910. The disclosure component 920 can be configured to cause disclosure of a heads-up display upon the eyewear element 910 while the eyewear element 910 is submerged underwater. The disclosure component 920 can be part of the mask in that it is part of a strap that keeps the mask on a head of the diver, the disclosure component 920 can physically connect to the eyewear element 910 to cause such disclosure, etc. In one embodiment, a housing (e.g., that is functionally equivalent to the housing 820 of FIG. 8) can be configured to retain the disclosure component 920 such that the disclosure component 920 functions without substantial adverse impact when submerged about 350 meters or less underwater. Thus, while underwater the eyewear element 910 can cause display of the heads-up display.

Figure 10:
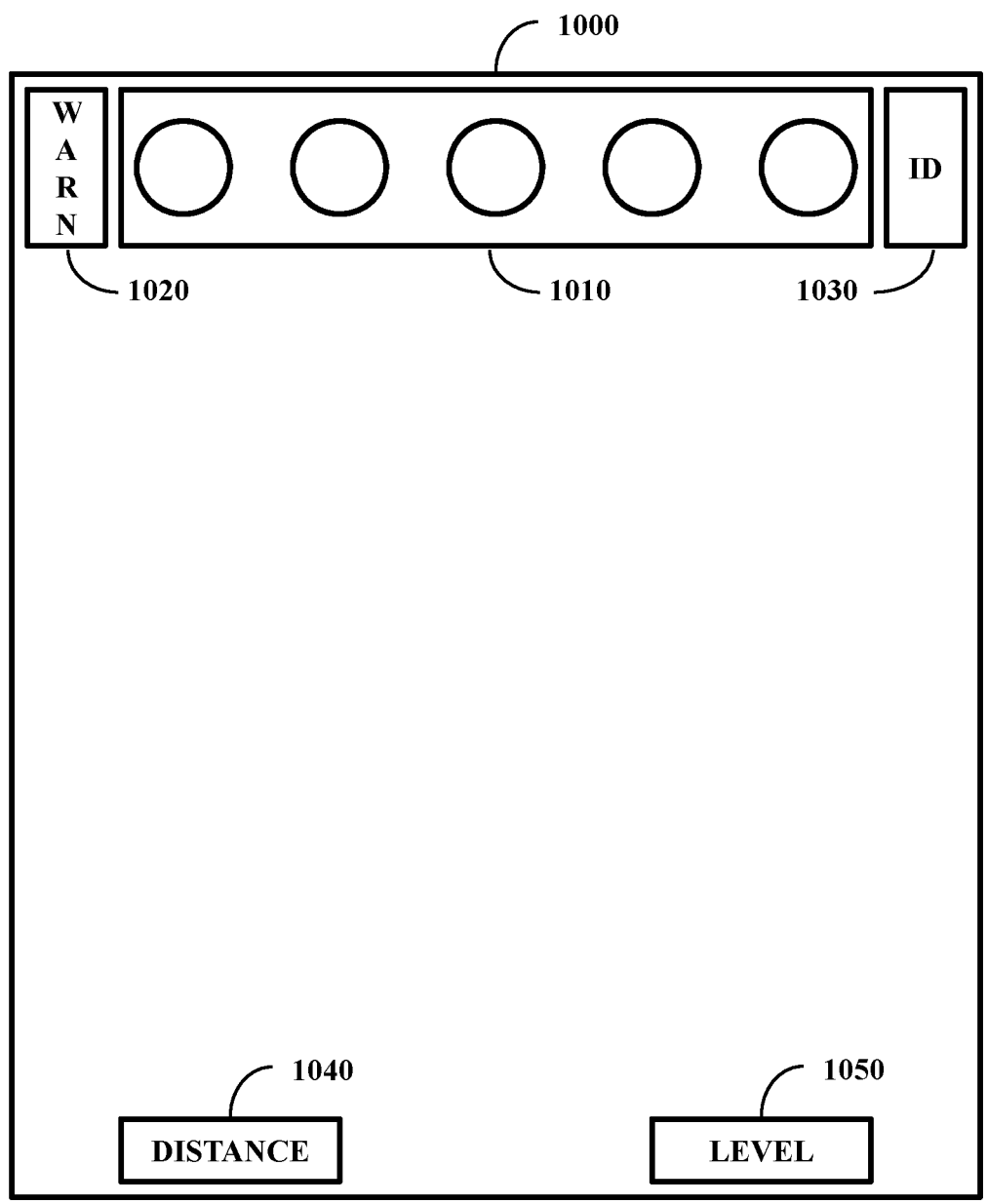
FIG. 10 illustrates one embodiment of a heads-up display.

FIG. 10 illustrates one embodiment of a heads-up display 1000. The heads-up display 1000 is an example heads-up display that can be presented upon the eyewear element 910 of FIG. 9. The heads-up display 1000 can have various portions that communicate information while non-portion areas can allow a wearer to see outside of the eyewear element 910 of FIG. 9. While distinct portions are shown, it is to be appreciated by one of ordinary skill in the art that portions may not be distinct with one another, different portions can be active at different times, and that portions may overlap.

In one embodiment, the heads-up display 1000 comprises a directional portion 1010 configured to indicate a location of the source 130 of FIG. 1 relative to a direction the wearer of the eyewear element 910 of FIG. 9 faces and/or a direction of an antenna (e.g., of the receiver 110 of FIG. 1) that receives the signal 120 of FIG. 1. In one embodiment, the directional portion is a light-emitting diode display integrated into the eyewear element 910 of FIG. 9. The directional portion 1010 can indicate to the wearer (e.g., the diver) where to travel in order to reach the source 130 of FIG. 1 and/or give an indication of the location of the source 130 of FIG. 1 so the source 130 of FIG. 1 can be avoided. In one embodiment, the directional portion 1010 can comprise multiple lights (e.g., five lights) that are green, yellow, or red depending on how the direction of the wearer matches the location of the source 130 of FIG. 1. In one embodiment, the multiple lights can have a light sequence that indicates how the direction of the wearer matches the location of the source 130 of FIG. 1 as well as how to improve a location to become closer to the source 130 of FIG. 1 (e.g., flashing the right or left lights with regard to which way to turn to more quickly reach the source 130 of FIG. 1). In one embodiment, the directional portion 1010 can communicate text.

In one embodiment, the heads-up display 1000 comprises a warning portion 1020 configured to indicate an equipment error for equipment employed by the wearer of the eyewear element 910 of FIG. 9 and/or of another (e.g., another diver of a party of the wearer) as well as other error types (e.g., dangerous depth warning). The warning portion 1020 can be a flashing light to indicate existence of the equipment error. The warning portion 1020 can be more detailed such as a text display on what piece of equipment is in error, specificity on the error, etc.

In one embodiment, the heads-up display 1000 comprises an identification portion 1030 configured to identify a specific transmitter associated with a specific signal received by a reception component (e.g., the receiver 110 of FIG. 1). In one example, multiple divers can be part of a dive team such as 'diver A', 'diver B', and 'diver C.' Diver C can become injured and press a distress button causing a broadcaster (e.g., the source 130 of FIG. 1) on their body or elsewhere (e.g., the repeater 610 of FIG. 6) to send a distress signal (e.g., the signal 120 of FIG. 1). As part of this distress signal an indication can be provided that diver C is distressed and diver C's name can be displayed in the identification portion 1030 while the warning portion 1020 flashes.

In one embodiment, the heads-up display 1000 comprises a distance portion 1040 configured to indicate a distance of the source 130 of FIG. 1 relative to a location of the wearer of the eyewear element 910 of FIG. 9. The distance can be longitudinal distance and/or latitudinal distance. The distance portion 1040 can include a directional arrow to indicate if the wearer is above/below the source 130 of FIG. 1 or to indicate if the source 130 of FIG. 1 is moving (e.g., sinking). The distance portion can also disclose distance information for the wearer such as displaying current depth.

In one embodiment, the heads-up display 1000 comprises a level portion 1050 configured to disclose a level of an oxygen level for a tank set of a wearer of the eyewear element 910 of FIG. 9. The oxygen level can include an amount of oxygen remaining in the tank set, an expected duration of proper submersion in view of the amount of oxygen remaining, etc. Different portions can integrate into singular portions, such as the level portion 1050 integrating with the warning portion 1020 such that when the level portion 1050 reaches or surpasses a certain threshold, the level portion 1050 can flash and thus also function as the warning portion 1020.

The heads-up display 1000 can comprise other portions as well. In one example the heads-up display 1000 can comprise a positional portion configured to positional information for the wearer of the eyewear element 910 of FIG. 9 (e.g., a depth portion configured to indicate a depth level of the underwater diver, a compass point with degree indication, etc.). This positional portion can replace or be part of the distance portion 1040. In one example, information integrated with the receiver 110 of FIG. 1 can have a portion, such as a direction that an antenna of the receiver 110 of FIG. 1 is facing. While shown as distinct portions, one physical area can be used for multiple portions (e.g., yellow and green for lights of the directional portion 1010 are used for direction while the lights turning red indicate a warning as the warning portion 1020 would indicate).

Further, the heads-up display 1000 can comprise a physical vital portion configured to disclose physical vital information about a person (e.g., one or more physical vitals), such as physical vital information of the diver wearing the mask and/or the physical vitals of a distressed diver. Example physical vitals can comprise heart rate, level of consciousness, breathing rate, body temperature, etc. In one example, the physical vital portion can be configured to be part of the heads-up display 1000 in a limited circumstance, such as when a threshold is met (e.g., the distressed diver becomes unconscious). The physical vital portion can be part of the identification portion 1030 (e.g., when addressing physical vital information about a person associated with the specific transmitter).

Figure 11:
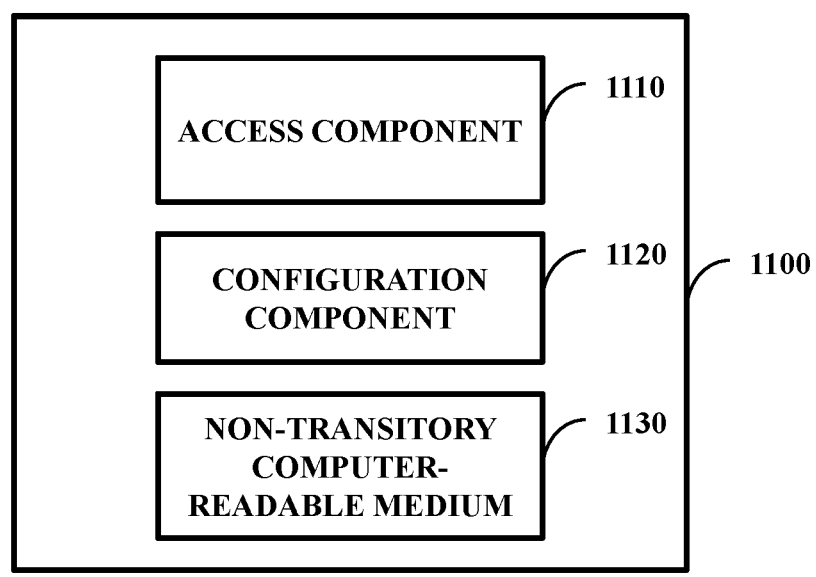
FIG. 11 illustrates one embodiment of an access component, a configuration component, and a non-transitory computer-readable medium.

FIG. 11 illustrates one embodiment of an access component 1110, a configuration component 1120, and a non-transitory computer-readable medium 1130. The access component 1110 can access a data set that pertains to an underwater diver (e.g., the wearer). This data set can be the oxygen level, information about the signal 120 of FIG. 1 (e.g., location of the source 130 of FIG. 1 as indicated by the signal 120 of FIG. 1 or the DC signal 270 of FIG. 2), etc. The configuration component 1120 can configure the heads-up display 1000 of FIG. 10 in accordance with the data set. The heads-up display 1000 of FIG. 10, as configured, can be disclosed upon the eyewear element 910 of FIG. 9 of the underwater diver. This configuration can include determining placement of different portions, determining information for inclusion of different portions, selecting an attribute of different portions (e.g., color of text in the portions based on darkness that surrounds the diver), etc. The non-transitory computer-readable medium 1130 can retain at least one instruction associated with the access component 1110, the configuration component 1120, at least one other component disclosed herein, or a combination thereof.

In one embodiment, the system 1100 can comprise the disclosure component 920 of FIG. 9. The disclosure component 920 of FIG. 9 can cause disclosure of the heads-up display 1000 of FIG. 10, as configured, upon the eyewear element 910 of FIG. 9. This disclosure can occur while the eyewear element 910 of FIG. 9 is submerged underwater. In one example, the configuration component 1120 can obtain information from the microcontroller unit 240 of FIG. 2 (e.g., the configuration component 1120 accesses information from the microcontroller unit 240 of FIG. 2, the configuration component 1120 is part of the microcontroller unit 240 of FIG. 2, etc.). The configuration component 1120 can process this information and determine what should be included on the heads-up display 1000 of FIG. 10, how content for the heads-up display 1000 of FIG. 10 should be arranged, etc. In accordance with the determination of the configuration component 1120 the disclosure component 920 of FIG. 9 can cause disclosure of the heads-up display 1000 of FIG. 10 (e.g., cause disclosure of the portions 1010-1050 of FIG. 10). The system 1100 can function in a feedback manner such that as information is updated (e.g., the diver's physical position changes relative to the source 130 of FIG. 1, new information about diving equipment is learned, etc.) the configuration component 1120 can determine an update for the heads-up display 1000 of FIG. 10. In turn, the disclosure component 920 of FIG. 9 can propagate this update (e.g., when oxygen level goes from 97% to 96% the level portion 1050 of FIG. 10 can reflect this change).

In one embodiment, the system 1100 comprises the housing 820 of FIG. 8. The housing 820 of FIG. 8 can be configured to retain the disclosure component 920 of FIG. 9, the access component 1110, the configuration component 1120, the non-transitory computer-readable medium 1130, at least one other component disclosed herein, or a combination thereof. The retention can be such that the disclosure component 920 of FIG. 9, the access component 1110, the configuration component 1120, the non-transitory computer-readable medium 1130, at least one other component disclosed herein, or a combination thereof function without substantial adverse impact when submerged about 350 meters or less (e.g., about 50 meters) underwater (e.g., when submerged at a safe depth for human divers).

Figure 12:
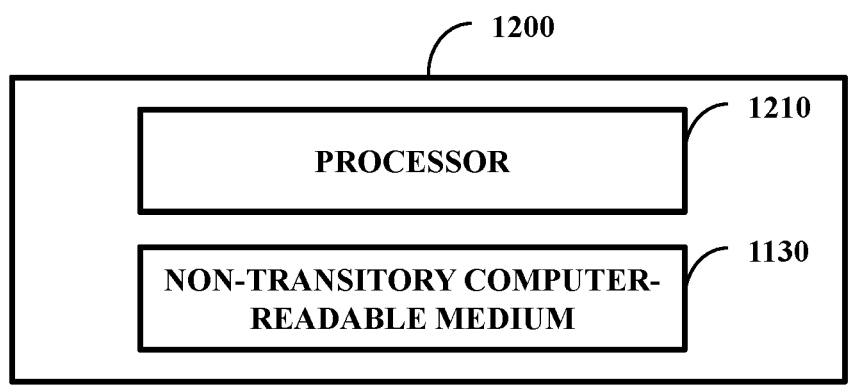
FIG. 12 illustrates one embodiment of a system comprising a processor and the non-transitory computer-readable medium.

FIG. 12 illustrates one embodiment of a system 1200 comprising a processor 1210 and the non-transitory computer-readable medium 1130. In one embodiment the non-transitory computer-readable medium 1130 is communicatively coupled to the processor 1210 and stores a command set executable by the processor 1210 to facilitate operation of at least one component disclosed herein (e.g., the first conversion component 310 and/or the second conversion component 320 of FIG. 3). In one embodiment, components disclosed herein (e.g., the access component 1110 and/or the configuration component 1120 of FIG. 11) can be implemented, at least in part, by way of non-software, such as implemented as hardware. In one embodiment the non-transitory computer-readable medium 1130 is configured to store processor-executable instructions that when executed by the processor 1210 cause the processor 1210 to perform a method disclosed herein (e.g., the methods 1300 and 1400 discussed below).

Figure 13:
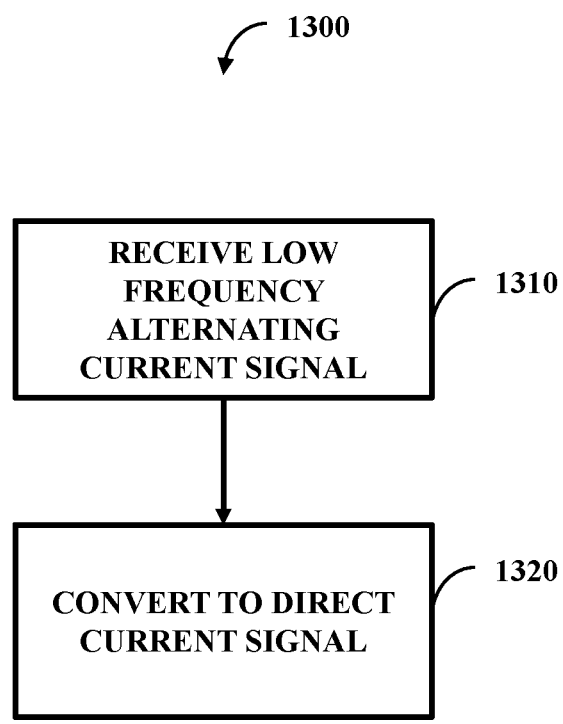
FIG. 13 illustrates one embodiment of a method with two actions.

FIG. 13 illustrates one embodiment of a method 1300 with two actions 1310-1320. At 1310 there is receiving the LF AC signal 280 of FIG. 2. This reception can be performed by the diving glove (e.g., that comprises the near-field receiver 360 of FIG. 3) while the diving glove is underwater and is worn by a diver. At 1320 converting the LF AC signal 280 of FIG. 2 to a DC voltage (e.g., by way of the DC signal 270 of FIG. 2) can occur. The DC voltage can be employed to determine a location of a base signal (e.g., the signal 120 of FIG. 1) from which the LF AC signal 280 of FIG. 2 is based. In one embodiment, the LF AC signal 280 of FIG. 2 can be received by way of an inductive pickup in the diving glove, such as from the transmitter 330 of FIG. 3 held by way of the diving glove when the transmitter 330 of FIG. 3 transmits the LF AC signal 280 of FIG. 2 by way of an inductive transmitter.

Figure 14:
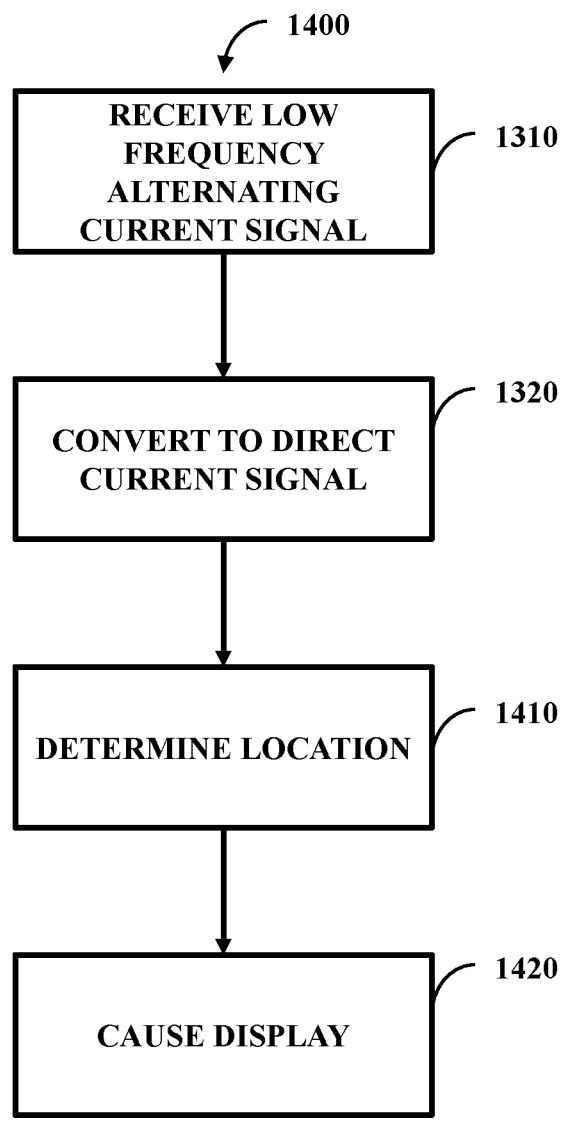
FIG. 14 illustrates one embodiment of a method with four actions.

FIG. 14 illustrates one embodiment of a method 1400 with four actions 1310-1320 and 1410-1420. At 1310 the above-discussed reception can occur and at 1320 the above-discussed conversion can occur. At 1410 determining the location of the base signal through employment of the DC voltage can take place. In one example, the DC voltage can correspond to a direction and/or distance found in a look-up table retained by the diving glove. At 1420 there can be causing display of an information set based, at least in part, on the location in a display (e.g., the eyewear element 920 of FIG. 9 by way of the directional portion 1010 of FIG. 10) of an underwater mask. In one embodiment, the information set includes proximity information with regard to the location and a line of sight for a wearer of the mask (e.g., line of sight with regard to the source 130 of FIG. 1).

Aspects disclosed herein can be practiced in a variety of environments and/or situations. In one example, an airplane can crash over a large body of water such as the Atlantic Ocean. The source 130 of FIG. 1 can be an event recorder of the airplane or a piece of equipment worn by the pilot. A mask of the pilot can be configured to function above water as well as underwater. The mask can provide an indication of where rescue personnel are located, thus the source 130 of FIG. 1 can also function as the receiver 110 of FIG. 1 depending on the perspective. In one example, the heads-up display 1000 of FIG. 10 on the mask can augment radio communication among a dive team and/or help if radio communication fails.

What is claimed is:

1. A method of determining a location of a base signal from a signal source, the method comprising:
    emitting a high frequency alternating current signal from the signal source while underwater, where the high frequency alternating current signal is the base signal from which a location information set is being ascertained,
    converting, by a receiver, the high frequency alternating current signal to a low frequency alternating current signal;
    receiving, by a diving glove, a low frequency alternating current signal while the diving glove is underwater; and
    converting, by a frequency-to-voltage converter from the diving glove, the low frequency alternating current signal to a direct current voltage;
    processing, by way of a microcontroller, the direct current voltage to identify a specific voltage; and
    determining, by way of the microcontroller, the location of the base signal according to the specific voltage value in a look-up table.

2. The method of claim 1,
    where the low frequency alternating current signal is received by way of an inductive pickup in the diving glove.

3. The system of claim 2,
    where the low frequency alternating current signal is received from a transmitter held by way of the diving glove and
    where the transmitter transmits the low frequency alternating current signal by way of an inductive transmitter.

4. The method of claim 3,
    where the diving glove is part of a bodysuit.

5. The method of claim 1, comprising:
    causing display of an information set based, at least in part, on the location in a display of an underwater mask.

6. The method of claim 5,
    where the information set includes proximity information with regard to the location and a line of sight for a wearer of the mask.

7. A system for determination of a location of a base signal from a signal source, the signal comprising:
    a signal source component configured to generate a high frequency alternating current signal from the signal source while underwater, where the high frequency alternating current signal is the base signal from which a location information set is being ascertained;
    a receiver configured to convert the high frequency alternating current signal to a low frequency alternating current signal; and
    a diving glove, configured to retain a human hand, comprising a housing,
    where the housing houses a frequency-to-voltage converter and a microcontroller,
    where the frequency-to-voltage converter is configured to receive the low frequency alternating current signal while the diving glove is underwater and converts the low frequency alternating current signal to a direct current voltage, and
    where the microcontroller is configured to process the direct current voltage to identify a specific voltage value and determine the location of the base signal according to a specific voltage value in a look-up table.

8. The system of claim 7,
    where the receiver is an inductive pickup.

9. The system of claim 8,
    where the low frequency alternating current signal is received from a transmitter held by way of the diving glove and
    where the transmitter transmits the low frequency alternating current signal by way of an inductive transmitter.

10. The system of claim 7, comprising:
    an alternating current to direct current converter configured to convert the low frequency alternating current signal to the direct current voltage.

11. The system of claim 7,
    where the diving glove is part of a diving wet suit.

12. A system for determination of a location of a base signal from a signal source, comprising:
    a signal source component configured to generate a high frequency alternating current signal from the signal source while underwater, the high frequency alternating current signal is the base signal from which location information is ascertained;
    a receiver configured to convert the high frequency alternating current signal to a low frequency alternating current signal;
    an alternating current to direct current converter configured to convert the low frequency alternating current signal received by a diving glove to a direct current voltage; and a microcontroller configured process the direct current voltage to identify a specific voltage value and determine the location of the base signal from according to the specific voltage value in a look-up table.

13. The system of claim 12,
where the low frequency alternating current signal is received at the glove by way of an inductive pickup in a palm area of the glove.

14. The system of claim 13,
where the low frequency alternating current signal is received from a transmitter held by way of the glove and
where the transmitter transmits the low frequency alternating current signal by way of an inductive transmitter.

15. The system of claim 13, comprising:
a wetsuit wearable by a diver, where the glove is an integrated part of the wetsuit.

16. The system of claim 15,
where the glove is configured to hold at least part of the transmitter and
where before transmission the low frequency alternating current signal is converted from a high frequency alternating current signal that is at a higher frequency than the low frequency alternating current signal to the low frequency alternating current signal.

17. The system of claim 16,
where before transmission the high frequency alternating current signal is converted to a direct current signal and then the direct current signal is converted to the low frequency alternating current signal that is received by the inductive pickup.

18. The system of claim 12, comprising:
a causation component configured to cause display of an information set based, at least in part, on the location in a display of an underwater mask.

19. The method of claim 18,
where the information set includes proximity information with regard to the location and a line of sight for a wearer of the mask.

* * * * *